(12) United States Patent
Innanje et al.

(10) Patent No.: US 10,887,558 B1
(45) Date of Patent: Jan. 5, 2021

(54) METHODS AND DEVICES FOR ENHANCING FUNCTIONALITIES RELATED TO SENSORS

(71) Applicant: SHANGHAI UNITED IMAGING INTELLIGENCE CO., LTD., Shanghai (CN)

(72) Inventors: Arun Innanje, Lexington, MA (US); Abhishek Sharma, Boston, MA (US); Ziyan Wu, Lexington, MA (US); Terrence Chen, Lexington, MA (US)

(73) Assignee: Shanghai United Imaging Intelligence Co., Ltd., Shanghai (CN)

( * ) Notice: Subject to any disclaimer, the term of this patent is extended or adjusted under 35 U.S.C. 154(b) by 0 days.

(21) Appl. No.: 16/564,472

(22) Filed: Sep. 9, 2019

(51) Int. Cl.
*H04N 7/18* (2006.01)
*H04L 29/08* (2006.01)

(52) U.S. Cl.
CPC ............ *H04N 7/183* (2013.01); *H04L 67/12* (2013.01); *H04L 67/16* (2013.01)

(58) Field of Classification Search
None
See application file for complete search history.

(56) References Cited

U.S. PATENT DOCUMENTS

| | | |
|---|---|---|
| 6,400,696 B1 | 6/2002 | Hreha |
| 8,776,161 B2 | 7/2014 | Gazier et al. |
| 2014/0095577 A1* | 4/2014 | Root ............... G16H 40/40 709/202 |
| 2015/0227638 A1* | 8/2015 | Crucs ............... G06F 16/972 715/760 |
| 2016/0072891 A1* | 3/2016 | Joshi ............ G06Q 30/0631 370/254 |

FOREIGN PATENT DOCUMENTS

| | | |
|---|---|---|
| WO | WO 2013/048910 | 4/2013 |
| WO | WO 2019/020514 | 1/2019 |

\* cited by examiner

*Primary Examiner* — Shih-Wei Kraft
(74) *Attorney, Agent, or Firm* — Faegre Drinker Biddle & Reath LLP

(57) ABSTRACT

Methods and systems for automatically setting up a sensor connected to an apparatus. For example, a computer-implemented method for automatically setting up a sensor connected to an apparatus includes: receiving a sensor-connection signal corresponding to a connection established between the sensor and the apparatus; determining whether a streaming microservice corresponding to the sensor has been downloaded onto the apparatus; if the streaming microservice has not been downloaded onto the apparatus, determining whether the streaming microservice corresponding to the sensor is supported by the apparatus; if the streaming microservice is supported by the apparatus, downloading a streaming microservice docker from a docker registry, the streaming microservice docker including the streaming microservice and a driver corresponding to the sensor; and deploying the streaming microservice with the driver corresponding to the sensor.

11 Claims, 5 Drawing Sheets

METHODS AND DEVICES FOR ENHANCING FUNCTIONALITIES RELATED TO SENSORS

1. BACKGROUND OF THE INVENTION

Certain embodiments of the present invention are directed to sensors. More particularly, some embodiments of the invention provide methods and devices for enhancing functionalities related to sensors. Merely by way of example, some embodiments of the invention have been applied to setting up a visual sensor. But it would be recognized that the invention has a much broader range of applicability.

Medical institutions are frequently equipped with visual sensors in operation rooms, scanning rooms, and operation theaters to assist radiologists and/or doctors with patient monitoring, patient care, and/or workflow analysis. Visual sensors are commonly placed on the ceiling, on top of the robot arm, or on the scanner, and fitted on cumbersome wiring systems for the long sensor cables. In many applications, multiple sensors are used for improved monitoring and analytics. In some scenarios, such as during CT, PET, and X-ray scans, a visual feed is streamed from one or more sensors in a scanning room to a remote location such as a monitoring room. In many cases, an original stream from a visual sensor is insufficient for providing diagnostics decisions and so these video streams need further processing and enriched that can then be restreamed for better decision making.

2. BRIEF SUMMARY OF THE INVENTION

Certain embodiments of the present invention are directed to sensors. More particularly, some embodiments of the invention provide methods and devices for enhancing functionalities related to sensors. Merely by way of example, some embodiments of the invention have been applied to setting up a visual sensor. But it would be recognized that the invention has a much broader range of applicability.

In various embodiments, a computer-implemented method for automatically setting up a sensor connected to an apparatus includes: receiving a sensor-connection signal corresponding to a connection established between the sensor and the apparatus; determining whether a streaming microservice corresponding to the sensor has been downloaded onto the apparatus; if the streaming microservice has not been downloaded onto the apparatus, determining whether the streaming microservice corresponding to the sensor is supported by the apparatus; if the streaming microservice is supported by the apparatus, downloading a streaming microservice docker from a docker registry; and deploying the streaming microservice with the driver corresponding to the sensor. In certain examples, the streaming microservice docker includes the streaming microservice with a driver corresponding to the sensor. In certain examples, deploying the streaming microservice with the driver includes setting up the apparatus to output at least one selected from an original stream and a processed stream to a display.

In various embodiments, a system for automatically setting up a sensor connected to an apparatus includes: a sensor discovery module configured to receive a sensor-connection signal corresponding to a connection established between the sensor and the apparatus; and a streaming managing module configured to determine whether a streaming microservice corresponding to the sensor has been downloaded onto the apparatus. In certain examples, the streaming managing module is configured to, if the streaming microservice has not been downloaded onto the apparatus, determine whether the streaming microservice corresponding to the sensor is supported by the apparatus. In certain examples, the streaming managing module is configured to, if the streaming microservice is supported by the apparatus, download a streaming microservice docker from a docker registry. In certain examples, the streaming managing module is configured to deploy the streaming microservice with the driver corresponding to the sensor. In certain examples, the streaming microservice docker includes the streaming microservice with a driver corresponding to the sensor. In certain examples, the streaming managing module is further configured to set up the apparatus to output at least one selected from an original stream and a processed stream to a display.

In various embodiments, a non-transitory computer-readable medium with instructions stored thereon, that when executed by a processor, perform the processes including: receiving a sensor-connection signal corresponding to a connection established between the sensor and the apparatus; determining whether a streaming microservice corresponding to the sensor has been downloaded onto the apparatus; if the streaming microservice has not been downloaded onto the apparatus, determining whether the streaming microservice corresponding to the sensor is supported by the apparatus; if the streaming microservice is supported by the apparatus, downloading a streaming microservice docker from a docker registry; and deploying the streaming microservice with the driver corresponding to the sensor. In certain examples, the streaming microservice docker includes the streaming microservice with a driver corresponding to the sensor. In certain examples, deploying the streaming microservice with the driver includes setting up the apparatus to output at least one selected from an original stream and a processed stream to a display.

Depending upon embodiment, one or more benefits may be achieved. These benefits and various additional objects, features and advantages of the present invention can be fully appreciated with reference to the detailed description and accompanying drawings that follow.

3. BRIEF DESCRIPTION OF THE DRAWINGS

4. DETAILED DESCRIPTION OF THE INVENTION

Certain embodiments of the present invention are directed to sensors. More particularly, some embodiments of the invention provide methods and devices for enhancing functionalities related to sensors. Merely by way of example, some embodiments of the invention have been applied to setting up a visual sensor. But it would be recognized that the invention has a much broader range of applicability.

Figure 1:
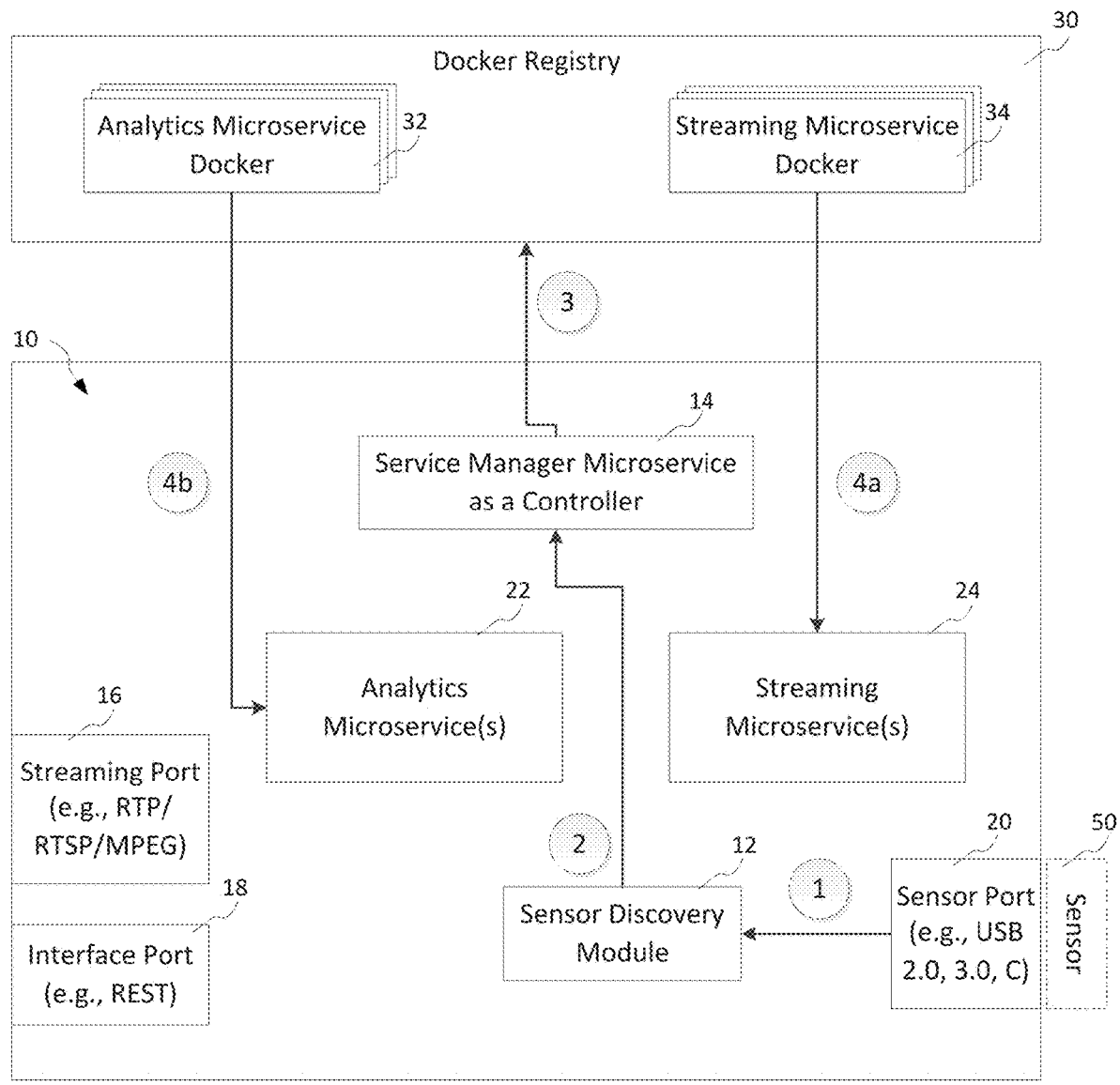
FIG. 1 is a simplified diagram showing a system for setting up one or more functionalities related to a sensor, according to some embodiments of the present invention.

FIG. 1 is a simplified diagram showing a system 10 for setting up a sensor 50, according to some embodiments of the present invention. This diagram is merely an example, which should not unduly limit the scope of the claims. One of ordinary skill in the art would recognize many variations, alternatives, and modifications. In certain examples, the system 10 is configured to automatically set up a sensor 50 connected, such as newly connected, to the system 10. In some examples, the system 10 (e.g., a medical edge device) includes a sensor discovery module 12, a service manager microservice 14, a streaming port 16, an interface port 18, and a sensor port 20. Although the above has been shown using a selected group of components for the neural network, there can be many alternatives, modifications, and variations. For example, some of the components may be expanded and/or combined. Other components may be inserted to those noted above. Depending upon the embodiment, the arrangement of components may be interchanged with others replaced. In some embodiments, the system 10 is configured to output an original stream according to FIG. 3, output a processed stream according to FIG. 4, and/or output analytics data according to FIG. 5.

In various embodiments, the sensor discovery module 12 is configured to receive a sensor-connection signal corresponding to a connection established between the sensor 50 and the system 10. In certain examples, the sensor discovery module 12 (e.g., a sensing data receiving module of the sensor discovery module) is configured to receive sensing data from the sensor 50. In some examples, the discovery module 12 (e.g., the sensing data receiving module of the sensor discovery module) is configured to receive a medical visual. For example, the medical visual includes a two-dimensional image, a three-dimensional image, and/or an animated image. In certain examples, the medical visual is static or dynamic. In various examples, the discovery module 12 (e.g., a sensing data receiving module of the sensor discovery module) is configured to receive a signal (e.g., included in the sensor-connection signal) corresponding to a sensor type, a sensor model, and/or a sensor identification number. In some examples, the sensor discovery module 12 connected to a sensor port 20 (e.g., an USB port such as a USB 2.0 port, a USB 3.0 port, or a USB C port) for receiving a sensor 50. In some examples, the sensor 50 is configured to capture, process, and restream (e.g., as RTSP, MPEG streams) data, such as via RESTful APIs. In some examples, the sensor discovery module 12 is configured to automatically detect a sensor 50 newly connected to the system 10. In some examples, the system 10 and/or the sensor discovery module 12 is configured to receive multiple sensors and to set up the multiple sensors, such as to set up the multiple sensors to become smart sensors from which sensing data is processible and stream-able by the system.

In various embodiments, the service manager microservice 14 includes a streaming managing module and/or an analytics managing module. In certain embodiments, the service manager microservice 14 is and/or can be downloaded to the system 10. In some embodiments, the service manager microservice 14 is configured as a controller of the system 10. In some examples, the service manager microservice 14 and/or the streaming managing module is configured to determine whether a streaming microservice corresponding to the sensor 50 has been downloaded onto the system 10. In certain embodiments, a streaming microservice corresponding to the sensor 50 is and/or can be downloaded onto the system 10 by downloading a streaming microservice docker including the streaming microservice. In certain examples, the service manager microservice 14 and/or the streaming managing module is configured to, if the streaming microservice has not been downloaded onto the system 10, determine whether the streaming microservice corresponding to the sensor 50 is supported by the system 10. In some examples, a microservice being supported by the system 10 is deployable once downloaded onto the system 10. For example, deploying a supported streaming microservice that has been downloaded onto the system 10 includes setting up the system 10 to output an original stream from the sensor 50 and/or a processed stream (e.g., processed original stream). In various examples, a supported streaming microservice includes (e.g., preconfigured with) a driver corresponding to the sensor 50. For example, deploying a streaming microservice includes deploying a driver included in (e.g., mounted onto) the streaming microservice, such as to set up operation and/or control of the sensor 50.

In some embodiments, the service manager microservice 14 and/or the streaming managing module is configured to, if the streaming microservice 24 corresponding to the sensor 50 is supported by the system 10, download a streaming microservice docker (e.g., from a docker registry 30). In some examples, the streaming microservice docker includes the streaming microservice 24 with the driver corresponding to the sensor 50. In various embodiments, the service manager microservice 14 and/or the streaming managing module is configured to deploy the streaming microservice 24 with the driver corresponding to the sensor 50. In certain examples, deploying the streaming microservice 24 with a driver includes pairing the sensor 50 with the streaming microservice. For example, when the sensor 50 is paired with the streaming microservice 24, sensing data is deliverable from the sensor 50 to the streaming microservice. In various examples, the service manager microservice 14 and/or the streaming managing module is configured to set up (e.g., as part of setting up the streaming microservice with the driver) the system 10 to output the original stream and/or the processed stream (e.g., to a display). In some examples, the service manager microservice 14 and/or the streaming managing module is configured to output the original stream and/or the processed stream through the streaming port 16 (e.g., a RTP port, a RTSP port, or a MPEG port).

In various embodiments, the service manager microservice 14 and/or the analytics managing module is configured to determine whether one or more analytics microservices 22 corresponding to the sensor 50 has been downloaded. In certain embodiments, one or more analytics microservices 22 corresponding to the sensor 50 is and/or can be downloaded onto the system 10 by downloading an analytics microservice docker including the one or more analytics microservices. In various examples, the service manager microservice 14 and/or the analytics managing module is configured to, if the one or more analytics microservices 22 has not been downloaded, download the analytics microservice docker including the one or more analytics microservices, such as from a docker registry that is the same (e.g., docker registry 30) or a different docker registry from which the streaming microservice is downloaded. In some examples, a microservice being supported by the system 10 is deployable once downloaded onto the system 10. For example, deploying a supported analytics microservice 22 that has been downloaded onto the system 10 includes setting up the system 10 to generate the processed stream and/or analytics data (e.g., based at least in part on the original stream).

In various embodiments, the service manager microservice 14 and/or the analytics managing module is configured to deploy the one or more analytics microservices. In certain examples, the service manager microservice 14 and/or the analytics managing module is configured to set up the system 10 to generate the processed stream and/or analytics data based at least in part on the original stream and to output the analytics data (e.g., to a display). In some examples, the service manager microservice 14 and/or the analytics managing module and/or an analytics data module (e.g., as part of the analytics managing module) is configured to generate the analytics data by processing the sensing data based at least in part on the one or more analytics microservices. In certain examples, the analytics data includes a positioning feedback, an adjustment instruction, and/or a reference pose. In various examples, the service manager microservice 14 and/or the analytics managing module is configured to set up the system 10 to output the analytics data to the display via the interface port 18 (e.g., a REST port). In various examples, the service manager microservice 14 and/or the analytics managing module is configured to set up the system 10 to output the analytics data for display. For example, the analytics data is output for display with the analytics data overlaid onto the original stream (e.g., as an enriched data). In another example, the analytics data is output for display adjacent to the original stream.

In some embodiments, the system 10 and/or the sensor discovery module 12 is configured to receive a sensor-disconnection signal corresponding to a disconnection between the sensor 50 and the system 10. In certain examples, once a sensor-disconnection signal is received, the system 10 and/or the service manager microservice 14 is configured to delete the analytics microservice docker from the apparatus and/or to delete the streaming microservice docker from the system 10.

In various examples, the docker registry 30 is an external storage configured to store one or more analytics microservice dockers 32 and one or more streaming microservice dockers 34. In some examples, the docker registry 30 is a privately-hosted docker registry coupled to the system 10. In some examples, each analytics microservice docker of the one or more analytics microservice dockers 32 corresponds to a sensor 50 supported by the system 10. In some examples, each streaming microservice docker of the one or more streaming microservice dockers 34 corresponds to a sensor 50 supported by the system 10.

Figure 2:
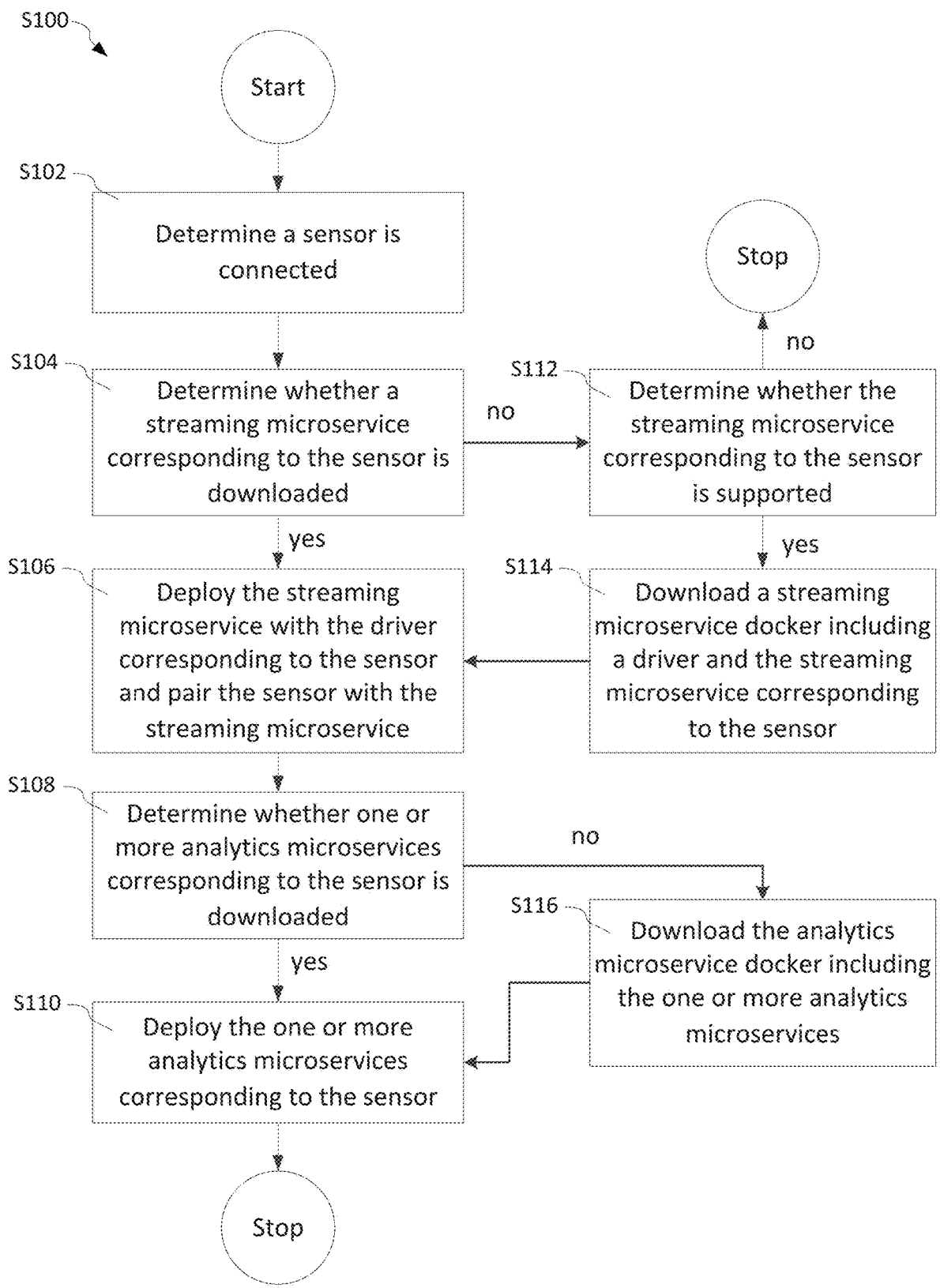
FIG. 2 is a simplified diagram showing a method for setting up one or more functionalities related to a sensor, according to some embodiments of the present invention.

FIG. 2 is a simplified diagram showing a method S100 for setting up a sensor (e.g., sensor 50), according to some embodiments of the present invention. This diagram is merely an example, which should not unduly limit the scope of the claims. One of ordinary skill in the art would recognize many variations, alternatives, and modifications. In certain examples, the method S100 is a method for automatically setting up a sensor (e.g., sensor 50) connected, such as newly connected, to a system (e.g., system 10), according to some embodiments of the present invention. In some examples, the method S100 includes a process S102 of determining a sensor (e.g., sensor 50) is connected, a process S104 of determining whether a streaming microservice (e.g., streaming microservice 24) corresponding to the sensor is (e.g., has been) downloaded (e.g., to the system), a process S106 of deploying the streaming microservice with a driver corresponding to the sensor and/or pairing the sensor with the streaming microservice, a process S108 of determining whether one or more analytics microservices (e.g., analytics microservice 22) corresponding to the sensor is downloaded, and/or a process S110 of deploying the one or more analytics microservices corresponding to the sensor. Although the above has been shown using a selected group of processes for the method, there can be many alternatives, modifications, and variations. For example, some of the processes may be expanded and/or combined. Other processes may be inserted to those noted above. Depending upon the embodiment, the sequence of processes may be interchanged with others replaced. In some embodiments, the method S100 for setting up one or more functionalities related to a sensor includes outputting an original stream according to FIG. 3, outputting a processed stream according to FIG. 4, and/or outputting analytics data according to FIG. 5.

In various embodiments, the method S100 further includes, if the process S104 determines that the streaming microservice corresponding to the sensor is not (e.g., has not been) downloaded (e.g., to the system 10), a process S112 of determining whether the streaming microservice corresponding to the sensor is supported (e.g., by the system 10 and/or a docker registry storing one or more streaming microservice dockers). In certain examples, the method S100 further includes, if the process S112 determines the streaming microservice corresponding to the sensor is supported, a process S114 of downloading a streaming microservice docker (e.g., from a docker registry) including the streaming microservice with the driver corresponding to the sensor. In certain examples, the method S100 further includes, if the process S108 determines the one or more analytics microservices corresponding to the sensor is not (e.g., has not been) downloaded (e.g., to the system 10), a process S116 of downloading the analytics microservice docker (e.g., from a docker registry) including the one or more analytics microservices.

In some embodiments, the process S102 includes receiving a sensor-connection signal corresponding to a connection established between the sensor and a system. In some examples, the connection is a physical connection (e.g., electrical connection) and/or a digital connection. In certain examples, receiving the sensor-connection signal includes receiving a signal corresponding to a sensor type, a sensor model, and/or a sensor identification (e.g., number, signature, and/or label) of the sensor connected to the system.

In some embodiments, the process S104 of determining whether a streaming microservice corresponding to the sensor is (e.g., has been) downloaded (e.g., to the system) includes determining whether a streaming microservice docker including the streaming microservice corresponding to the sensor is (e.g., has been) downloaded (e.g., to the system). In certain examples, a docker registry (e.g., docker registry 30) includes one or more streaming microservice dockers (e.g., streaming microservice dockers 34), and each streaming microservice docker of the one or more streaming microservice dockers corresponds to a sensor of a sensor type, a sensor model, and/or of a sensor identification (e.g., number, signature, and/or label). In certain examples, each streaming microservice docker the one or more streaming microservice dockers includes a streaming microservice corresponding to the sensor with a driver corresponding to the sensor.

In some embodiments, if the process S104 determines that the streaming microservice corresponding to the sensor is not (e.g., has not been) downloaded (e.g., to the system 10), performing the method S100 includes performing the process S112 of determining whether the streaming microservice corresponding to the sensor is supported (e.g., by the system 10 and/or a docker registry storing one or more streaming microservice dockers). In various examples, the process S112 includes determining whether the streaming microservice corresponding to the sensor is supported (e.g., compatible) by the system and/or determining whether the streaming microservice corresponding to the sensor is supported (e.g., available for download) by the docker registry storing one or more streaming microservice dockers.

In some embodiments, if the process S112 determines the streaming microservice corresponding to the sensor is not supported, the method S100 terminates (e.g., stops). In some embodiments, if the process S112 determines the streaming microservice corresponding to the sensor is supported, performing the method S100 includes performing the process S114 of downloading a streaming microservice docker (e.g., from a docker registry) including the streaming microservice (e.g., streaming microservice 24) with the driver corresponding to the sensor. In various embodiments, downloading a streaming microservice includes downloading the streaming microservice as a deployable operating system, such as a deployable operating system that does not run directly on the system (e.g., system 10), such as a virtual operation system. In some examples, downloading a streaming microservice includes or is replaced by mounting a streaming microservice.

In some embodiments, if the process S104 determines that the streaming microservice corresponding to the sensor is (e.g., has been) downloaded (e.g., to the system 10), and/or after the process S114 during which the streaming microservice is downloaded, performing the method S100 includes performing the process S106 of deploying the streaming microservice with a driver corresponding to the sensor and/or pairing the sensor with the streaming microservice. In some examples, pairing the sensor with the streaming microservice includes coupling the sensor and the system for data transfer via the streaming microservice. In certain examples, the process S106 of deploying the streaming microservice with the driver includes setting up the system (e.g., system 10) to output an original stream and/or a processed stream to a display (e.g., display 60 of FIGS. 3-5). In certain embodiments, the method S100 includes outputting the original stream and/or the processed stream to the display via a streaming port (e.g., port 16). In some examples, the process S106 of deploying the streaming microservice with the driver includes setting up the system (e.g., system 10) to receive sensing data from the sensor. For example, sensing data includes a medical visual including a two-dimensional image, a three-dimensional image, and/or an animated image.

In some embodiments, the process S108 of determining whether one or more analytics microservices corresponding to the sensor is downloaded includes determining whether an analytics microservice docker including the one or more analytics microservices (e.g., analytics microservice 22) corresponding to the sensor is (e.g., has been) downloaded (e.g., to the system). In certain examples, a docker registry (e.g., the same or a separate docker registry from the one storing the one or more streaming microservice dockers) includes one or more analytics microservice dockers, and each analytics microservice docker of the one or more analytics microservice dockers corresponds to a sensor of a sensor type, a sensor model, and/or of a sensor identification.

In some embodiments, if the process S108 determines that the one or more microservices corresponding to the sensor is not (e.g., has not been) downloaded (e.g., to the system 10), performing the method S100 includes performing the process S116 of downloading the analytics microservice docker (e.g., from the docker registry) including the one or more analytics microservices. In various embodiments, downloading an analytics microservice includes downloading the analytics microservice as a deployable operating system, such as a deployable operating system that does not run directly on the system (e.g., system 10), such as a virtual operation system. In some examples, downloading an analytics microservice includes or is replaced by mounting an analytics microservice.

In some embodiments, if the process S108 determines that the one or more analytics microservices corresponding to the sensor is (e.g., has been) downloaded (e.g., to the system 10), and/or after the process S116 during which the one or more analytics microservices is downloaded, performing the method S100 includes performing the process S110 of deploying the one or more analytics microservices. In various examples, the process S110 of deploying the one or more analytics microservices includes setting up the system (e.g., system 10) to generate a processed stream and/or analytics data based at least in part on the original stream (e.g., from, such as directly from, the sensor). In various examples, the process S110 of deploying the one or more analytics microservices includes setting up the system (e.g., system 10) to output the analytics data to the display (e.g., display 60 of FIGS. 3-5). In certain examples, setting up the system to output the analytics data to the display includes setting up the system to output the analytics data to the display via an interface port (e.g., port 18). In certain examples, setting up the system to output the analytics data to the display includes setting up the system to output the analytics data to the display for displaying the analytics data overlaid onto the original stream or displaying the analytics data adjacent to the original stream.

In various embodiments, the method S100 includes receiving sensing data from the sensor, such as receiving a medical visual (e.g., original stream) including a two-dimensional image, a three-dimensional image, and/or an animated image. In some examples, the sensing data is received by a deployed streaming microservice and/or a deployed analytics microservice, the streaming microservice and/or the analytics microservice previously downloaded (e.g., mounted) onto the system (e.g., system 10). In various embodiments, the method S100 includes generating the analytics data by processing the sensing data based at least in part on the one or more analytics microservices corresponding to the sensor. In certain examples, using the deployed one or more analytics microservices, generating analytics data includes generating a positioning feedback, an adjustment instruction, and/or a reference pose. In some examples, the method S110 further includes displaying the analytics data overlaid onto the original stream and/or displaying the analytics data adjacent to the original stream.

In some embodiments, the method S100 further includes receiving a sensor-disconnection signal corresponding to a disconnection between the sensor (e.g., sensor 50) and the system (e.g., system 10), deleting (e.g., unloading, dismounting) the analytics microservice docker from the system, and deleting (e.g., unloading, dismounting) the streaming microservice docker from the system. For example, the disconnection signal corresponds to a loss of physical connection (e.g., electrical connection) and/or a loss of digital connection between the sensor and the system.

Figure 3:
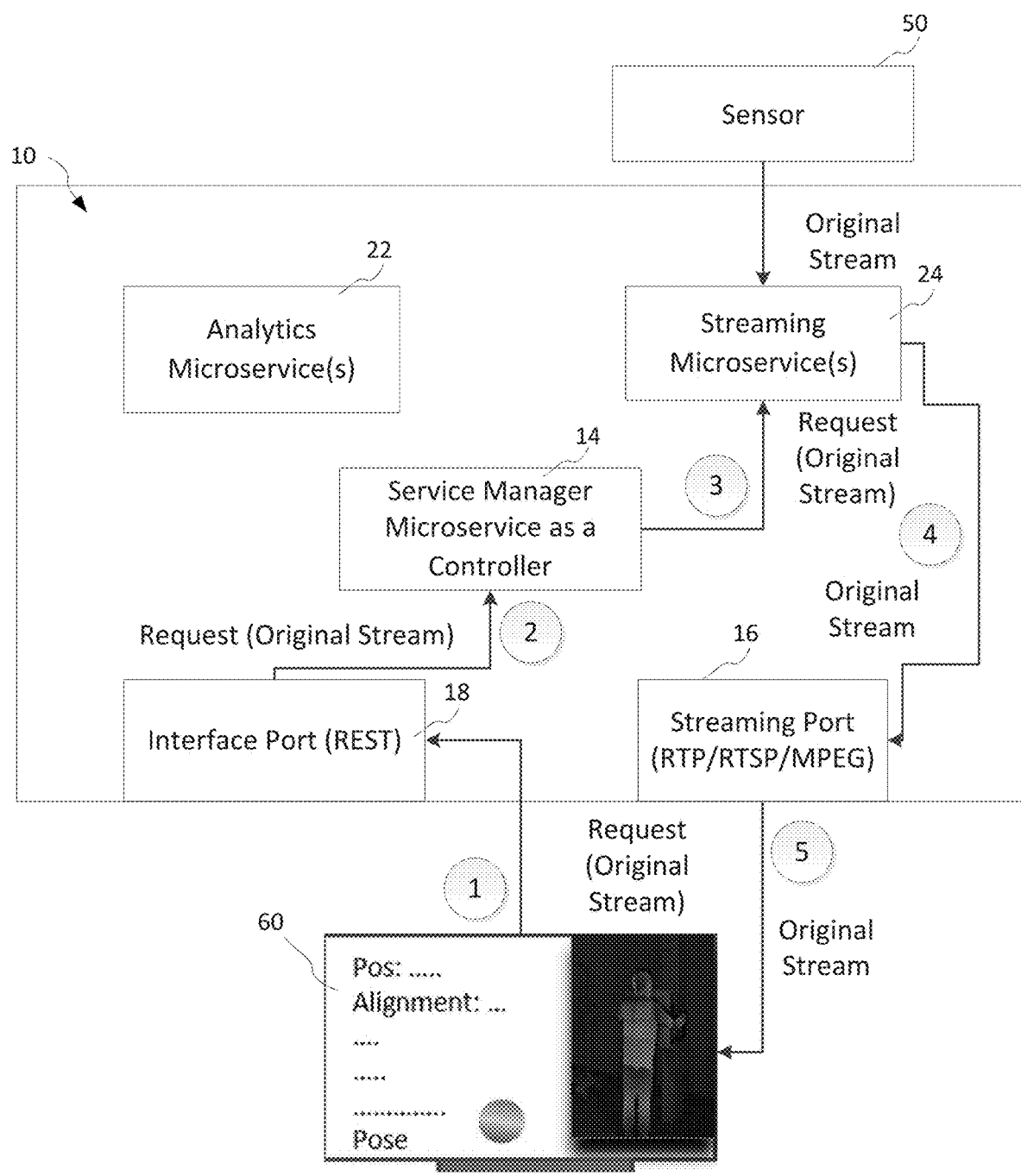
FIG. 3 is a simplified diagram showing a system configured to output an original stream, according to some embodiments of the present invention.

FIG. 3 is a simplified diagram showing the system 10 configured to output an original stream (e.g., sensing data), according to some embodiments of the present invention. In some examples, the system 10 is configured to receive a request for the original stream, such as via the interface port 18 (e.g., a REST port) and/or via a service manager microservice 14 (e.g., as a controller of the system). In certain examples, a streaming microservice 24 (e.g., one functioning as an operating system) corresponding to a sensor connected to the system is downloaded (e.g., mounted) onto the system and deployed and the system is configured to send the request for the original stream to the streaming microservice. In various examples, the system 10 and/or the deployed streaming microservice 24 is configured to receive the original stream from the sensor 50 and the request for the original stream and to output (e.g., stream) the original stream, such as via a streaming port 16 (e.g., a RTP port, a RTSP port, or a MPEG port). In some examples, the request is sent by a server, such as a client server. In some examples, the original stream is outputted to a server (e.g., one with the display 60), such as the client server from which the request is sent or another client server.

Figure 4:
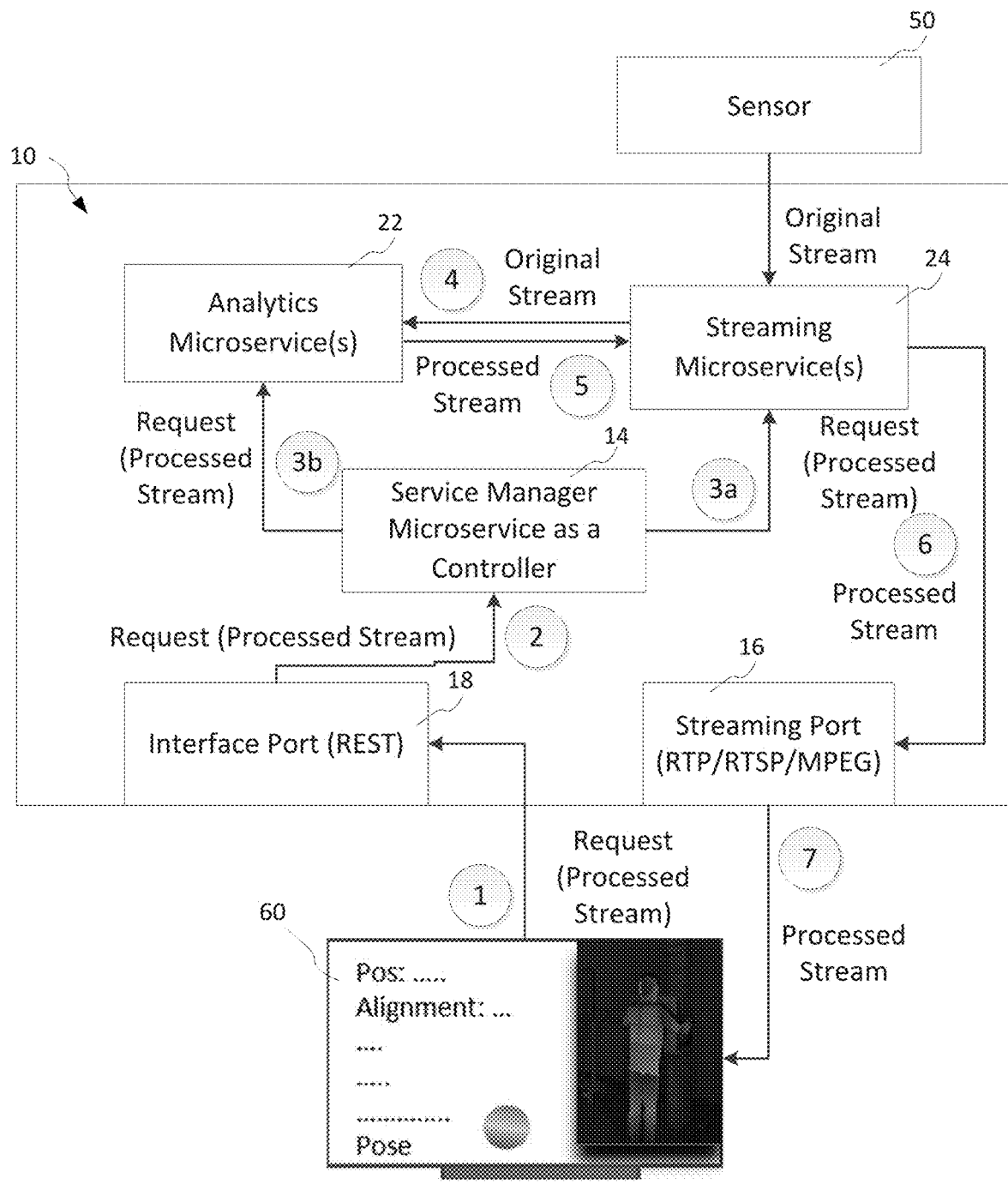
FIG. 4 is a simplified diagram showing a system configured to output a processed stream, according to some embodiments of the present invention.

FIG. 4 is a simplified diagram showing the system 10 configured to output a processed stream, according to some embodiments of the present invention. In some examples, the system 10 is configured to receive a request for the processed stream, such as via an interface port 18 (e.g., a REST port) and/or via a service manager microservice 14 (e.g., as a controller of the system). In certain examples, a streaming microservice 24 (e.g., one functioning as an operating system) corresponding to a sensor 50 connected to the system 10 is downloaded (e.g., mounted) onto the system and deployed and the system is configured to send the request for the processed stream to the streaming microservice. In various examples, the system 10 and/or the deployed streaming microservice 24 is configured to receive the original stream (e.g., sensing data) from the sensor 50 and the request for the processed stream and to output (e.g., stream) the original stream to a deployed analytics microservice previously downloaded onto the system. In some examples, the original stream is sent to one or more deployed analytics microservices 22. In certain examples, the deployed analytics microservice 22 is configured to receive the request for the processed stream, to receive the original stream from the sensor 50, such as via the streaming microservice 24, to generate the processed stream, and to output the processed stream, such as via a streaming port 16 (e.g., a RTP port, a RTSP port, or a MPEG port), such as via the streaming microservice 24. In some examples, the request is sent by a server, such as a client server. In some examples, the processed stream is outputted to a server (e.g., one with the display 60), such as the client server from which the request is sent or another client server.

Figure 5:
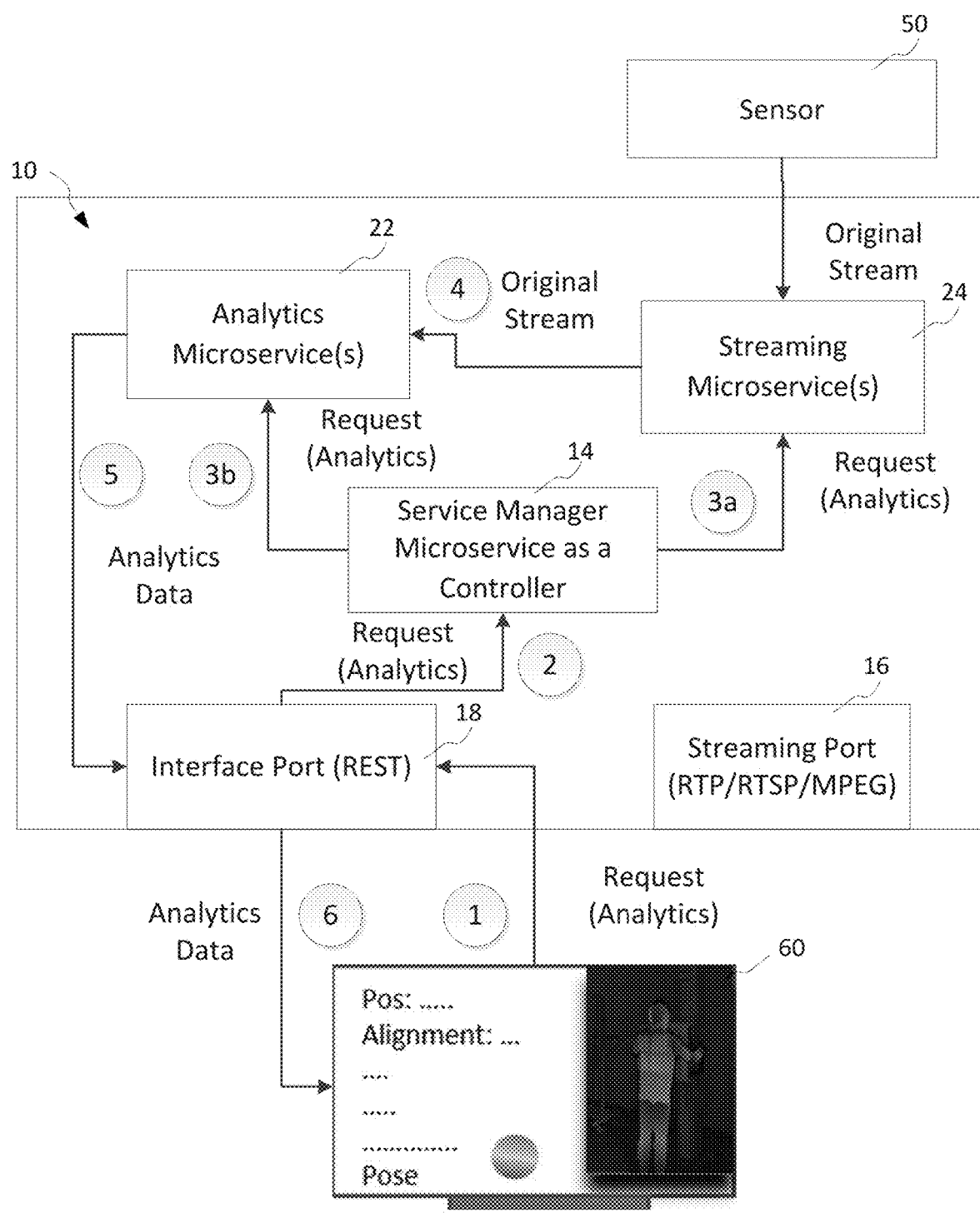
FIG. 5 is a simplified diagram showing a system configured to output analytics data, according to some embodiments of the present invention.

FIG. 5 is a simplified diagram showing a system 10 configured to output analytics data, according to some embodiments of the present invention. In some examples, the system is configured to receive a request for the analytics data, such as via an interface port 18 (e.g., a REST port) and/or via a service manager microservice 14 (e.g., as a controller of the system). In certain examples, a streaming microservice (e.g., one functioning as an operating system) corresponding to a sensor 50 connected to the system 10 is downloaded (e.g., mounted) onto the system and deployed and the system is configured to send the request for the analytics data to the streaming microservice 24. In various examples, the system 10 and/or the deployed streaming microservice 24 is configured to receive the original stream (e.g., sensing data) from the sensor 50 and the request for the analytics data and to output (e.g., stream) the original stream to an analytics microservice 22. Alternatively, the original stream is sent directly from the sensor 50 to the deployed analytics microservice 22. In certain examples, the deployed analytics microservice 22 is configured to receive the request for the analytics data, to receive the original stream from the sensor 50, such as via the streaming microservice 24, to generate the analytics data, and to output the analytics data, such as via the interface port 18. In some examples, the request is sent by a server, such as a client server. In some examples, the analytics data is outputted to a server (e.g., one with the display 60), such as the client server from which the request is sent or another client server.

In various embodiments, a computer-implemented method for automatically setting up a sensor connected to an apparatus includes receiving a sensor-connection signal corresponding to a connection established between the sensor and the apparatus; determining whether a streaming microservice corresponding to the sensor has been downloaded onto the apparatus; if the streaming microservice has not been downloaded onto the apparatus, determining whether the streaming microservice corresponding to the sensor is supported by the apparatus; if the streaming microservice is supported by the apparatus, downloading a streaming microservice docker from a docker registry, the streaming microservice docker including the streaming microservice and a driver corresponding to the sensor; and deploying the streaming microservice with the driver corresponding to the sensor. In certain examples, deploying the streaming microservice with the driver includes setting up the apparatus to output at least one selected from an original stream and a processed stream to a display. In some examples, the computer-implemented method is implemented according to at least the method S100 of FIG. 2. In certain examples, the method is implemented by at least the system 10 of FIG. 1.

In some embodiments, the computer-implemented method further includes: determining whether one or more analytics microservices corresponding to the sensor has been downloaded; if the one or more analytics microservices has not been downloaded, downloading an analytics microservice docker including the one or more analytics microservices from the docker registry; and deploying the one or more analytics microservices. In certain examples, deploying the one or more analytics microservices includes setting up the apparatus to: generate the processed stream and analytics data based at least in part on the original stream; and output the analytics data to the display.

In some embodiments, the computer-implemented method further includes: receiving sensing data from the sensor; and generating the analytics data by processing the sensing data based at least in part on the one or more analytics microservices.

In some embodiments, receiving the sensing data from the sensor includes receiving a medical visual including at least one selected from a two-dimensional image, a three-dimensional image, and an animated image.

In some embodiments, generating the analytics data by processing the sensing data based at least in part on the one or more analytics microservices includes generating at least one selected from a positioning feedback, an adjustment instruction, and a reference pose.

In some embodiments, setting up the apparatus to output the analytics data to the display includes setting up the apparatus to output the analytics data to the display via a REST interface port.

In some embodiments, setting up the apparatus to output the analytics data to the display includes: setting up the apparatus to output the analytics data to the display for at least one selected from: displaying the analytics data overlaid onto the original stream; and displaying the analytics data adjacent to the original stream.

In some embodiments, receiving a sensor-connection signal corresponding to a connection established between the sensor and the apparatus includes receiving a signal corresponding to at least one selected from a sensor type, a sensor model, and a sensor identification number.

In some embodiments, the computer-implemented method further includes: receiving a sensor-disconnection signal corresponding to a disconnection between the sensor and the apparatus; deleting the analytics microservice docker from the apparatus; and deleting the streaming microservice docker from the apparatus.

In some embodiments, deploying the streaming microservice with the driver corresponding to the sensor includes pairing the sensor with the streaming microservice.

In various embodiments, a system for automatically setting up a sensor connected to an apparatus includes: a sensor discovery module configured to receive a sensor-connection signal corresponding to a connection established between the sensor and the apparatus; and a streaming managing module configured to: determine whether a streaming microservice corresponding to the sensor has been downloaded onto the apparatus; if the streaming microservice has not been downloaded onto the apparatus, determine whether the streaming microservice corresponding to the sensor is supported by the apparatus; if the streaming microservice is supported by the apparatus, download a streaming microservice docker from a docker registry, the streaming microservice docker including the streaming microservice and a driver corresponding to the sensor; and deploy the streaming microservice with the driver corresponding to the sensor. In certain examples, the streaming managing module is further configured to set up the apparatus to output at least one selected from an original stream and a processed stream to a display. In some examples, the system is implemented according to at least the system 10 of FIG. 1 and/or configured to perform at least the method S100 of FIG. 2.

In some embodiments, the system further includes an analytics managing module configured to: determine whether one or more analytics microservices corresponding to the sensor has been downloaded; if the one or more analytics microservices has not been downloaded, download an analytics microservice docker including the one or more analytics microservices from the docker registry; and deploy the one or more analytics microservices. In certain examples, the analytics managing module is further configured to set up the apparatus to: generate the processed stream and analytics data based at least in part on the original stream; and output the analytics data to the display.

In some embodiments, the system further includes a sensing data receiving module configured to receive sensing data from the sensor; and an analytics data module configured to generate the analytics data by processing the sensing data based at least in part on the one or more analytics microservices.

In some embodiments, the sensing data receiving module is further configured to receive a medical visual including at least one selected from a two-dimensional image, a three-dimensional image, and an animated image.

In some embodiments, the analytics data module is further configured to generate at least one selected from a positioning feedback, an adjustment instruction, and a reference pose.

In some embodiments, the analytics managing module is further configured to set up the apparatus to output the analytics data to the display via a REST interface port.

In some embodiments, the analytics managing module is further configured to: set up the apparatus to output the analytics data to the display for at least one selected from: display the analytics data overlaid onto the original stream; and display the analytics data adjacent to the original stream.

In some embodiments, the sensor discovery module is further configured to receive a signal corresponding to at least one selected from a sensor type, a sensor model, and a sensor identification number.

In some embodiments, the sensor discovery module is further configured to receive a sensor-disconnection signal corresponding to a disconnection between the sensor and the apparatus. In certain examples, the analytics managing module is configured to, in response to the sensor-disconnection signal, delete the analytics microservice docker from the apparatus. In certain examples, the streaming managing module is configured to, in response to the sensor-disconnection signal, delete the streaming microservice docker from the apparatus.

In some embodiments, the analytics managing module is further configured to pair the sensor with the streaming microservice.

In various embodiments, a non-transitory computer-readable medium with instructions stored thereon, that when executed by a processor, perform the processes including: receiving a sensor-connection signal corresponding to a connection established between the sensor and the apparatus; determining whether a streaming microservice corresponding to the sensor has been downloaded onto the apparatus; if the streaming microservice has not been downloaded onto the apparatus, determining whether the streaming microservice corresponding to the sensor is supported by the apparatus; if the streaming microservice is supported by the apparatus, downloading a streaming microservice docker from a docker registry; and deploying the streaming microservice with the driver corresponding to the sensor. In certain examples, the streaming microservice docker includes the streaming microservice with a driver corresponding to the sensor. In certain examples, deploying the streaming microservice with the driver includes setting up the apparatus to output at least one selected from an original stream and a processed stream to a display. In some examples, the non-transitory computer-readable medium with instructions stored thereon is implemented according to at least the method S100 of FIG. 2, and/or by the system 10 (e.g., a terminal).

In some embodiments, the non-transitory computer-readable medium, that when executed by a processor, further perform the processes including: determining whether one or more analytics microservices corresponding to the sensor has been downloaded; if the one or more analytics microservices has not been downloaded, downloading an analytics microservice docker including the one or more analytics microservices from the docker registry; and deploying the one or more analytics microservices. In certain examples, deploying the one or more analytics microservices includes setting up the apparatus to: generate the processed stream and analytics data based at least in part on the original stream; and output the analytics data to the display.

In some embodiments, the non-transitory computer-readable medium, that when executed by a processor, further perform the processes including: receiving sensing data from the sensor; and generating the analytics data by processing the sensing data based at least in part on the one or more analytics microservices.

In some embodiments, receiving the sensing data from the sensor includes receiving a medical visual including at least one selected from a two-dimensional image, a three-dimensional image, and an animated image.

In some embodiments, generating the analytics data by processing the sensing data based at least in part on the one or more analytics microservices includes generating at least one selected from a positioning feedback, an adjustment instruction, and a reference pose.

In some embodiments, setting up the apparatus to output the analytics data to the display includes setting up the apparatus to output the analytics data to the display via a REST interface port.

In some embodiments, setting up the apparatus to output the analytics data to the display includes: setting up the apparatus to output the analytics data to the display for at least one selected from: displaying the analytics data overlaid onto the original stream; and displaying the analytics data adjacent to the original stream.

In some embodiments, receiving a sensor-connection signal corresponding to a connection established between the sensor and the apparatus includes receiving a signal corresponding to at least one selected from a sensor type, a sensor model, and a sensor identification number.

In some embodiments, the non-transitory computer-readable medium, that when executed by a processor, further perform the processes including: receiving a sensor-disconnection signal corresponding to a disconnection between the sensor and the apparatus; deleting the analytics microservice docker from the apparatus; and deleting the streaming microservice docker from the apparatus.

In some embodiments, deploying the streaming microservice with the driver corresponding to the sensor includes pairing the sensor with the streaming microservice.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, while the embodiments described above refer to particular features, the scope of the present invention also includes embodiments having different combinations of features and embodiments that do not include all of the described features. In yet another example, various embodiments and/or examples of the present invention can be combined.

Additionally, the methods and systems described herein may be implemented on many different types of processing devices by program code including program instructions that are executable by the device processing subsystem. The software program instructions may include source code, object code, machine code, or any other stored data that is operable to cause a processing system to perform the methods and operations described herein. Other implementations may also be used, however, such as firmware or even appropriately designed hardware configured to perform the methods and systems described herein.

The systems' and methods' data (e.g., associations, mappings, data input, data output, intermediate data results, final data results, etc.) may be stored and implemented in one or more different types of computer-implemented data stores, such as different types of storage devices and programming constructs (e.g., RAM, ROM, EEPROM, Flash memory, flat files, databases, programming data structures, programming variables, IF-THEN (or similar type) statement constructs, application programming interface, etc.). It is noted that data structures describe formats for use in organizing and storing data in databases, programs, memory, or other computer-readable media for use by a computer program.

The systems and methods may be provided on many different types of computer-readable media including computer storage mechanisms (e.g., CD-ROM, diskette, RAM, flash memory, computer's hard drive, DVD, etc.) that contain instructions (e.g., software) for use in execution by a processor to perform the methods' operations and implement the systems described herein. The computer components, software modules, functions, data stores and data structures described herein may be connected directly or indirectly to each other in order to allow the flow of data needed for their operations. It is also noted that a module or processor includes a unit of code that performs a software operation and can be implemented for example as a subroutine unit of code, or as a software function unit of code, or as an object (as in an object-oriented paradigm), or as an applet, or in a computer script language, or as another type of computer code. The software components and/or functionality may be located on a single computer or distributed across multiple computers depending upon the situation at hand.

The computing system can include client devices and servers. A client device and server are generally remote from each other and typically interact through a communication network. The relationship of client device and server arises by virtue of computer programs running on the respective computers and having a client device-server relationship to each other.

This specification contains many specifics for particular embodiments. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations, one or more features from a combination can in some cases be removed from the combination, and a combination may, for example, be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Although specific embodiments of the present invention have been described, it will be understood by those of skill in the art that there are other embodiments that are equivalent to the described embodiments. Accordingly, it is to be understood that the invention is not to be limited by the specific illustrated embodiments.

What is claimed is:
1. A computer-implemented method for automatically setting up a sensor connected to an apparatus, the method comprising:
receiving a sensor-connection signal corresponding to a connection established between the sensor and the apparatus;

receiving sensing data from the sensor by at least receiving a medical visual including at least one selected from a two-dimensional image, a three-dimensional image, and an animated image;

determining whether a streaming microservice corresponding to the sensor has been downloaded onto the apparatus;

in response to determining the streaming microservice has not been downloaded onto the apparatus, determining whether the streaming microservice corresponding to the sensor is supported by the apparatus; and in response to determining the streaming microservice is supported by the apparatus, downloading a streaming microservice docker from a docker registry, the streaming microservice docker including the streaming microservice and a driver corresponding to the sensor; and deploying the streaming microservice with the driver corresponding to the sensor;

determining whether one or more analytics microservices corresponding to the sensor have been downloaded;

in response to determining the one or more analytics microservices have not been downloaded, downloading an analytics microservice docker including the one or more analytics microservices from the docker registry;

deploying the one or more analytics microservices; and generating analytics data by processing the sensing data based at least in part on the one or more analytics microservices;

wherein the deploying the streaming microservice with the driver includes setting up the apparatus to output at least one selected from an original stream and a processed stream to a display;

wherein the deploying the one or more analytics microservices includes setting up the apparatus to:

generate the processed stream and the analytics data based at least in part on the original stream; and output the analytics data to the display for at least one selected from:

displaying the analytics data overlaid onto the original stream; and displaying the analytics data adjacent to the original stream.

2. The computer-implemented method of claim 1, wherein the generating analytics data by processing the sensing data based at least in part on the one or more analytics microservices includes:

generating at least one selected from a positioning feedback, an adjustment instruction, and a reference pose.

3. The computer-implemented method of claim 1, wherein the setting up the apparatus to output the analytics data to the display includes:

setting up the apparatus to output the analytics data to the display via a REST interface port.

4. The computer-implemented method of claim 1, wherein the receiving a sensor-connection signal corresponding to a connection established between the sensor and the apparatus includes:

receiving a signal corresponding to at least one selected from a sensor type, a sensor model, and a sensor identification number.

5. The computer-implemented method of claim 1, further comprising:

receiving a sensor-disconnection signal corresponding to a disconnection between the sensor and the apparatus;

deleting the analytics microservice docker from the apparatus; and deleting the streaming microservice docker from the apparatus.

6. The computer-implemented method of claim 1, wherein the deploying the streaming microservice with the driver corresponding to the sensor includes:

pairing the sensor with the streaming microservice.

7. A system for automatically setting up a sensor connected to an apparatus, the system comprising:

a processor and a memory;

a sensor discovery module configured to receive a sensor-connection signal corresponding to a connection established between the sensor and the apparatus;

a sensing data receiving module configured to receive sensing data from the sensor;

a streaming managing module configured to:

determine whether a streaming microservice corresponding to the sensor has been downloaded onto the apparatus; and in response to determining the streaming microservice has not been downloaded onto the apparatus, determine whether the streaming microservice corresponding to the sensor is supported by the apparatus; and in response to determining the streaming microservice is supported by the apparatus, download a streaming microservice docker from a docker registry, the streaming microservice docker including the streaming microservice and a driver corresponding to the sensor;

deploy the streaming microservice with the driver corresponding to the sensor;

an analytics managing module configured to:

determine whether one or more analytics microservices corresponding to the sensor have been downloaded;

in response to determining the one or more analytics microservices have not been downloaded, download an analytics microservice docker including the one or more analytics microservices from the docker registry; and deploy the one or more analytics microservices; and an analytics data module configured to generate analytics data by processing the sensing data based at least in part on the one or more analytics microservices;

wherein the streaming managing module is further configured to set up the apparatus to output at least one selected from an original stream and a processed stream to a display;

wherein the analytics managing module is further configured to set up the apparatus to:

generate the processed stream and the analytics data based at least in part on the original stream; and output the analytics data to the display for at least one selected from:

displaying the analytics data overlaid onto the original stream; and displaying the analytics data adjacent to the original stream.

8. The system of claim 7, wherein the sensing data receiving module is further configured to:

receive a medical visual including at least one selected from a two-dimensional image, a three-dimensional image, and an animated image.

9. The system of claim 7, wherein the analytics data module is further configured to:

generate at least one selected from a positioning feedback, an adjustment instruction, and a reference pose.

10. The system of claim 7, wherein the analytics managing module is further configured to:
set up the apparatus to output the analytics data to the display via a REST interface port.

11. A non-transitory computer-readable medium with instructions stored thereon, that upon execution by a processor, perform processes comprising:
receiving a sensor-connection signal corresponding to a connection established between a sensor and an apparatus;
receiving sensing data from the sensor by at least receiving a medical visual including at least one selected from a two-dimensional image, a three-dimensional image, and an animated image;
determining whether a streaming microservice corresponding to the sensor has been downloaded onto the apparatus;
in response to determining the streaming microservice has not been downloaded onto the apparatus,
determining whether the streaming microservice corresponding to the sensor is supported by the apparatus; and
in response to determining the streaming microservice is supported by the apparatus,
downloading a streaming microservice docker from a docker registry, the streaming microservice docker including the streaming microservice and a driver corresponding to the sensor; and
deploying the streaming microservice with the driver corresponding to the sensor;
determining whether one or more analytics microservices corresponding to the sensor have been downloaded;
in response to determining the one or more analytics microservices have not been downloaded,
downloading an analytics microservice docker including the one or more analytics microservices from the docker registry;
deploying the one or more analytics microservices; and
generating analytics data by processing the sensing data based at least in part on the one or more analytics microservices;
wherein the deploying the streaming microservice with the driver includes setting up the apparatus to output at least one selected from an original stream and a processed stream to a display;
wherein the deploying the one or more analytics microservices includes setting up the apparatus to:
generate the processed stream and the analytics data based at least in part on the original stream; and
output the analytics data to the display for at least one selected from:
displaying the analytics data overlaid onto the original stream; and
displaying the analytics data adjacent to the original stream.

* * * * *